United States Patent
Krishnamoorthi et al.

(10) Patent No.: US 9,036,567 B2
(45) Date of Patent: May 19, 2015

(54) LOGICAL CHANNEL MAPPING FOR INCREASED UTILIZATION OF TRANSMISSION RESOURCES

(75) Inventors: Raghuraman Krishnamoorthi, San Diego, CA (US); Gordon Kent Walker, Poway, CA (US); Fuyun Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 12/699,596

(22) Filed: Feb. 3, 2010

(65) Prior Publication Data
US 2011/0188459 A1 Aug. 4, 2011

(51) Int. Cl.
*H04W 72/04* (2009.01)
*H04N 21/63* (2011.01)
*H04N 21/2383* (2011.01)
*H04N 21/2385* (2011.01)
*H04N 21/438* (2011.01)

(52) U.S. Cl.
CPC ......... *H04N 21/631* (2013.01); *H04N 21/2383* (2013.01); *H04N 21/2385* (2013.01); *H04N 21/4382* (2013.01)

(58) Field of Classification Search
CPC .......... H04N 21/2383; H04N 21/2385; H04N 21/4382; H04N 21/631
USPC ........... 370/241, 252, 310, 328, 329; 375/295
See application file for complete search history.

(56) References Cited

U.S. PATENT DOCUMENTS

| | | | | |
|---|---|---|---|---|
| 5,930,259 A * | 7/1999 | Katsube et al. | | 370/409 |
| 6,393,152 B2 * | 5/2002 | Takahashi et al. | | 382/233 |
| 6,519,266 B1 * | 2/2003 | Manning et al. | | 370/469 |
| 7,515,616 B2 * | 4/2009 | Yi et al. | | 370/519 |
| 7,630,451 B2 * | 12/2009 | Collins et al. | | 375/261 |
| 7,685,498 B2 * | 3/2010 | Mizuta | | 714/762 |
| 7,756,080 B2 * | 7/2010 | Sebire et al. | | 370/329 |
| 7,940,797 B2 * | 5/2011 | Lee et al. | | 370/469 |
| 7,983,238 B2 * | 7/2011 | Hwang et al. | | 370/348 |
| 2001/0012322 A1 | 8/2001 | Nagaoka et al. | | |
| 2006/0183287 A1 | 8/2006 | Collins et al. | | |
| 2007/0066313 A1 | 3/2007 | Collins et al. | | |

(Continued)

FOREIGN PATENT DOCUMENTS

| | | |
|---|---|---|
| KR | 20090053918 A | 5/2009 |
| WO | WO03049449 A2 | 6/2003 |

(Continued)

OTHER PUBLICATIONS

International Search Report and Written Opinion—PCT/US2011/023507—ISA/EPO—Jul. 27, 2011.

(Continued)

*Primary Examiner* — Chi H Pham
*Assistant Examiner* — Robert Lopata
(74) *Attorney, Agent, or Firm* — Arent Fox LLP

(57) ABSTRACT

Methods, systems, and apparatus, including computer programs encoded on computer readable storage media, for increasing utilization of transmission resources by mapping data from a block of layered codec data onto a plurality of logical channels for transmission of the mapped data. Resource utilization may also be improved by mapping data from at least two layers of a block of layered of codec data onto a logical channel that supports only a single data channel carried by a transmit modulation scheme.

78 Claims, 9 Drawing Sheets

(56) References Cited

U.S. PATENT DOCUMENTS

| | | |
|---|---|---|
| 2007/0147539 A1 | 6/2007 | Gorokhov et al. |
| 2007/0270170 A1* | 11/2007 | Yoon et al. .................... 455/509 |
| 2008/0045272 A1* | 2/2008 | Wang et al. .................... 455/561 |
| 2008/0049597 A1 | 2/2008 | Walker et al. |
| 2008/0062909 A1* | 3/2008 | Shin et al. ...................... 370/315 |
| 2008/0152003 A1* | 6/2008 | Oguz ........................ 375/240.12 |
| 2009/0092174 A1 | 4/2009 | Wang |
| 2009/0220034 A1* | 9/2009 | Ramprashad et al. ........ 375/341 |
| 2010/0132000 A1* | 5/2010 | Straub et al. .................. 725/117 |
| 2010/0195526 A1* | 8/2010 | Stauffer et al. ............... 370/252 |
| 2011/0051681 A1* | 3/2011 | Ahn et al. ..................... 370/330 |
| 2011/0075758 A1* | 3/2011 | Nam et al. .................... 375/295 |
| 2011/0175867 A1* | 7/2011 | Satake .......................... 345/204 |
| 2012/0026904 A1* | 2/2012 | Pietraski ....................... 370/252 |
| 2012/0026921 A1* | 2/2012 | Choi ............................. 370/281 |

FOREIGN PATENT DOCUMENTS

| | | |
|---|---|---|
| WO | WO2008079825 | 7/2008 |
| WO | WO2009039638 A1 | 4/2009 |

OTHER PUBLICATIONS

Lei Z et al.: "Adaptive video transcoding and streaming over wireless channels" Journal of Systems & Software, vol. 75, No. 3, Mar. 1, 2005, pp. 253-270, XP004656968.

Notice of Allowance in Korean Application No. 10-2012-7023073, dated Jul. 29, 2014, 3 pages.

\* cited by examiner

LOGICAL CHANNEL MAPPING FOR INCREASED UTILIZATION OF TRANSMISSION RESOURCES

TECHNICAL FIELD

The present disclosure relates generally to electronic communication and, more particularly, to wireless communication.

BACKGROUND

Media Forward Link Only (also referred to herein as MediaFLO or FLO) and DVB-H systems provide for hierarchical data channels created by operating different data streams on respectively differing portions of the modulation signal constellation. As shown in FIG. 1, the base channel (or base modulation layer) is represented by the upper two bits of a 16 QAM constellation, while the enhancement channel (or enhancement modulation layer) is represented by the lower two (least significant) bits. This exemplary scheme results in 1 bit in the enhancement layer for each bit in the base layer, a 1:1 ratio. Other constellations maybe divided into other sets of layers, but all hierarchical systems based on fixed allocation of modulation states to a layer will result in a fixed data rate ratio among the various layers. The above-described use of hierarchical data channels is also referred to herein as layered modulation. For a FLO system, a Multicast Logical Channel (MLC) that utilizes the hierarchical data channels is referred to herein as a layered MLC. An MLC that does not employ hierarchical data channels is referred to herein as a non-layered MLC.

The aforementioned fixed data rate ratio between the N available channels can cause inefficiencies when used with codecs that produce layered source coding. For example, temporal based layering for video codecs such as H.264 can result in streams with close to 1:1 bit rate proportions for high motion content; however the ratio of bit rates for low motion content can be highly imbalanced. Similarly, stereo audio may be coded as L+R and L−R, however the L+R signal on average may contain twice as much data as the L−R signal. There are conditions under which the audio data rates can be balanced, but it is not the nominal condition. There is accordingly a need for variable bit rate ratio among the respective modulation layers, and variable bit rate overall. Although existing systems such as MediaFLO and DVB-H allow for variable bit rates, their hierarchical layered modulation schemes structurally result in the ratio of the bit rates being integer or rational fractional values.

SUMMARY

This specification describes technologies relating to logical channel mapping for increased utilization of transmission resources. One innovative aspect of the subject matter described in this specification can be implemented in methods that include the actions of improving the utilization of transmission resources by mapping data from a block of layered codec data onto a plurality of logical channels for transmission of the mapped data. Resource utilization may also be improved by mapping data from at least two layers of a block of layered of codec data onto a logical channel that supports only a single data channel carried by a transmit modulation scheme. Other implementations of this aspect include corresponding systems, apparatus, and computer programs, configured to perform the actions of the methods, encoded on computer readable storage media.

These and other implementations can each optionally include one or more of the following features. One of the logical channels can support a plurality of hierarchical data channels carried on a transmit modulation scheme, and another of the logical channels can support only a single data channel carried on the transmit modulation scheme. The hierarchical data channels of the one logical channel may carry data from respective ones of the hierarchical layers, and the another logical channel may carry data from only one of the hierarchical layers. One of the hierarchical data channels may carry essential data from the block, and another of the hierarchical data channels may carry optional data from the block. The another hierarchical data channel may carry a subset of a total amount of optional data contained in the block, and the another logical channel may carry another subset of the total amount of optional data contained in the block.

One of the logical channels may support a plurality of hierarchical data channels carried on a transmit modulation scheme, and another of the logical channels may support only a single data channel carried on the transmit modulation scheme. The hierarchical data channels of the one logical channel may carry data from respective ones of the hierarchical layers, and the another logical channel may carry data from only one of the hierarchical layers. One of the hierarchical data channels may carry essential data from the block, and another of the hierarchical data channels may carry optional data from the block. The one hierarchical data channel may carry a subset of a total amount of essential data contained in the block, and the another logical channel may carry another subset of the total amount of essential data contained in the block.

One of the logical channels may support a plurality of hierarchical data channels carried on a transmit modulation scheme, and another of the logical channels may support only a single data channel carried on the transmit modulation scheme. The hierarchical data channels of the one logical channel may carry data from respective ones of the hierarchical layers, and the another logical channel may carry data from only one of the hierarchical layers. The aforementioned only one of the hierarchical layers may consist of essential data of the block.

One of the logical channels may support a plurality of hierarchical data channels carried on a transmit modulation scheme, and another of the logical channels may support only a single data channel carried on the transmit modulation scheme. The hierarchical data channels of the one logical channel may carry data from respective ones of the hierarchical layers, and the another logical channel may carry data from only one of the hierarchical layers. The aforementioned only one of the hierarchical layers may consist of optional data of the block.

A further mapping of data from at least two of the hierarchical layers onto a further logical channel may be produced, and a choice between the first-mentioned mapping and the further mapping may be made for wireless transmission of the mapped data. One of the plurality of logical channels may support a plurality of hierarchical data channels, another of the plurality of logical channels may support only a single data channel, and the further logical channel may support only a single data channel. The further mapping may exclude a portion of one of the hierarchical layers.

A further mapping of data from at least two of the hierarchical layers onto a further logical channel may be produced, and a choice between the first-mentioned mapping and the further mapping may be made for wireless transmission of the mapped data. One of the plurality of logical channels may support a plurality of hierarchical data channels, another of the plurality of logical channels may support only a single data channel, the further logical channel may support a plurality of hierarchical data channels, and the further mapping may exclude a portion of one of the hierarchical layers.

Each of the logical channels may support only a single data channel. A further mapping of data from the block onto a further plurality of logical channels may be produced, and a choice between the first-mentioned mapping and the further mapping may be made for wireless transmission of the mapped data. One of the first-mentioned plurality of logical channels may support a plurality of hierarchical data channels, another of the first-mentioned plurality of logical channels may support only a single data channel, and each of the further plurality of logical channels may support only a single data channel.

The data block may contain one of audio data and image data. The logical channels may be Multicast Logical Channels of a Media Forward Link Only system. Another innovative aspect of the subject matter described in this specification may be implemented in methods that include the actions of improving the utilization of transmission resources by mapping data from at least two layers of a block of layered of codec data onto a logical channel that supports only a single data channel carried by a transmit modulation scheme. These and other implementations may each optionally provide for the mapping to exclude a portion of one of the hierarchical layers.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the present work and is not intended to represent the only embodiments in which the present work may be practiced. The detailed description includes specific details for the purpose of providing a thorough understanding of the present work. However, it will be apparent to those skilled in the art that the present work may be practiced without these specific details. In some instances, well known structures and components are shown in block diagram form in order to avoid obscuring the concepts of the present work. The word "exemplary" is used herein to mean "serving as an example, instance, or illustration." Any embodiment described herein as "exemplary" is not necessarily to be construed as preferred or advantageous over other embodiments.

In the following detailed description, various concepts will be described in the context of FLO technology. While these concepts may be well suited for this application, those skilled in the art will readily appreciate that these concepts are likewise applicable to other technologies. Accordingly, any reference to FLO technology is intended only to illustrate these concepts, with the understanding that such concepts have a wide range of applicability.

Figure 9:
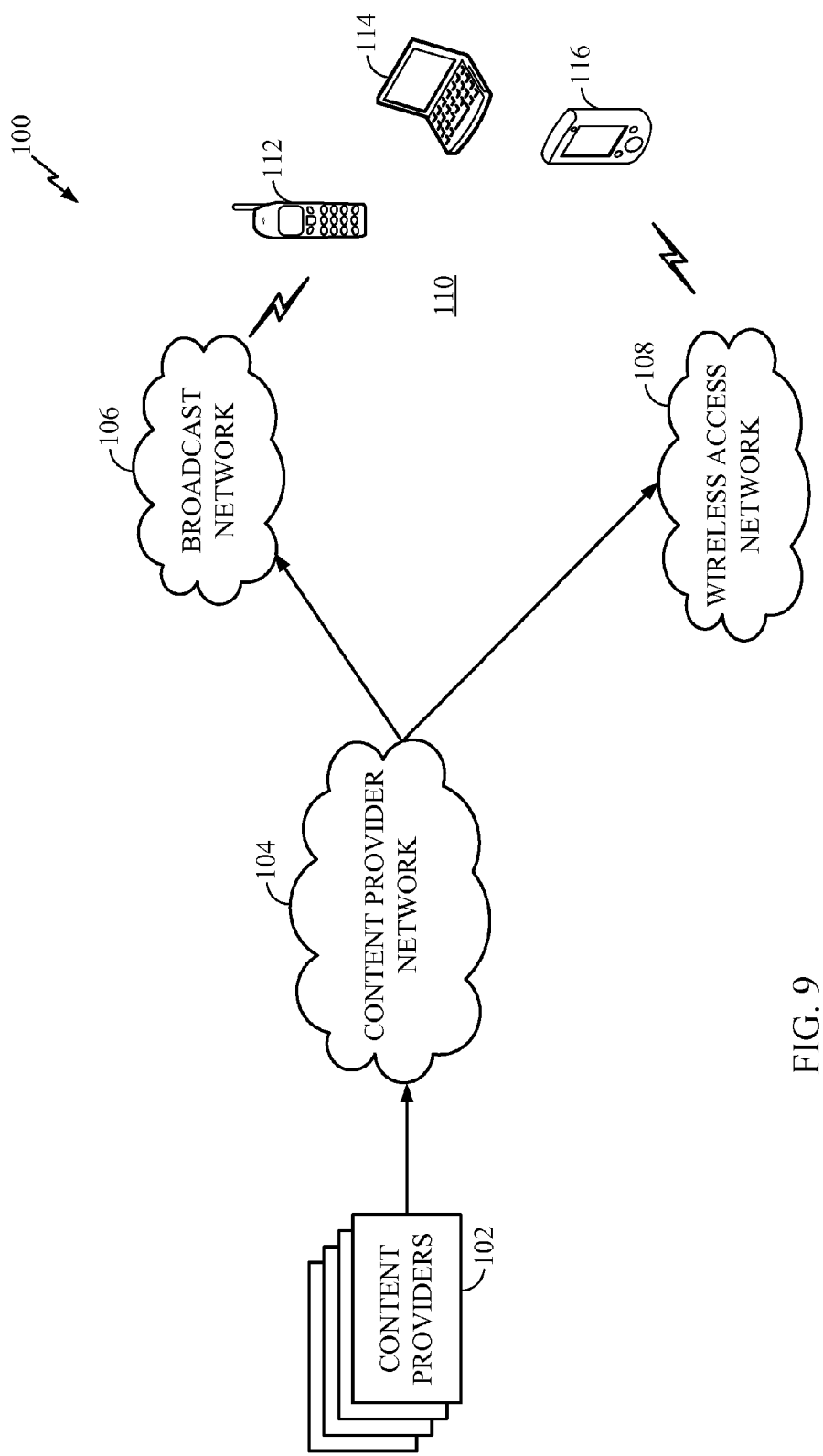
FIG. 9 diagrammatically illustrates a communications system according to exemplary embodiments of the present work.

FIG. 9 shows a communications system 100 in which principles according to the present work may be incorporated. In general, the system 100 creates and broadcasts multimedia content across various networks to a large number of mobile subscribers. The communications system 100 includes any number of content providers 102, a content provider network 104, a broadcast network 106, and a wireless access network 108. The communications system 100 is also shown with a number of devices 110 used by mobile subscribers to receive multimedia content. These devices 110 include a mobile telephone 112, a personal digital assistant (PDA) 114, and a laptop computer 116. The devices 110 illustrate just some of the devices that are suitable for use in the communications system 100. It should be noted that although three devices are shown in FIG. 9, virtually any number of analogous devices or types of devices are suitable for use in the communications system 100, as would be apparent to those skilled in the art.

The content providers 102 provide content for distribution to mobile subscribers in the communications system 100. The content may include video, audio, multimedia content, clips, real-time and non real-time content, scripts, programs, data or any other type of suitable content. The content providers 102 provide content to the content provider network for wide-area or local-area distribution.

The content provider network 104 comprises any combination of wired and wireless networks that operate to distribute content for delivery to mobile subscribers. In the example illustrated in FIG. 9, the content provider network 104 distributes content through a broadcast network 106. The broadcast network 106 comprises any combination of wired and wireless proprietary networks that are designed to broadcast high quality content. These proprietary networks may be distributed throughout a large geographic region to provide seamless coverage to mobile devices. Typically, the geographic region will be divided into sectors with each sector providing access to wide-area and local-area content.

The content provider network 104 may also include a content server (not shown) for distribution of content through a wireless access network 108. The content server communicates with a base station controller (BSC) (not shown) in the wireless access network 108. The BSC may be used to manage and control any number of base transceiver station (BTSs) (not shown) depending on the geographic reach of the wireless access network 108. The BTSs provide access to wide-area and local-area content for the various devices 110.

The multimedia content broadcast by the content providers 102 can include one or more services. A service is an aggregation of one or more independent data components. Each independent data component of a service is called a flow. By way of example, a cable news service may include three flows: a video flow, an audio flow, and a control flow.

Services are carried over one of more logical channels. In FLO applications, a logical channel is often referred to as a Multicast Logical Channel (MLC). A logical channel may be divided into multiple logical sub-channels. These logical sub-channels are called streams. Each flow is carried in a single stream. The content for a logical channel is transmitted through the various networks in a physical frame. In FLO applications, the physical frame is often referred to as a superframe.

The air interface used to transmit the physical frames to the various devices 110 shown in FIG. 9 may vary depending on the specific application and the overall design constraints. In general, communication systems employing FLO technology utilize Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

MediaFLO supports layered source (audio or video) coding with hierarchical data channels having a 1:1 data rate split between the enhanced modulation layer and the base modulation layer. Exemplary embodiments of the present work provide for variable data rate between multiple modulation layers and more efficient packing of the data within the modulation layers. In some embodiments, enhancement layer data frames produced by the transmit end codec are apportioned among more than one FLO MLC. In some embodiments, the codec enhancement layer data frames are combined in a single non-layered MLC with the codec base layer data frames. In some embodiments, the codec enhancement layer data frames are apportioned among more than one MLC, one of which also carries the codec base layer data frames.

Some embodiments provide the capability of allocating multiple MLCs with different operational modes for the different codec layers (base layer and one or more enhancement layers). This permits the use of existing MLC resources to transmit different codec layers that have independently variable bit rates. This approach may be made more effective by making the media encoding of the system aware of the allowed data sizes, and adjusting data size accordingly, if possible. There is a discrete set of solutions (i.e., combinations of data sizes and available MLCs with different operational modes) at the physical layer, and suitable selection logic chooses the most efficient solution.

In some embodiments, the different codec data layers are defined by respectively different frame types. Frames that impact video buffer memory are in general terms required for transmission. If a required frame is not received, there is a persistent error in the video frame buffers, and the receive end codec may have to re-acquire in order to flush the buffers.

Figure 2:
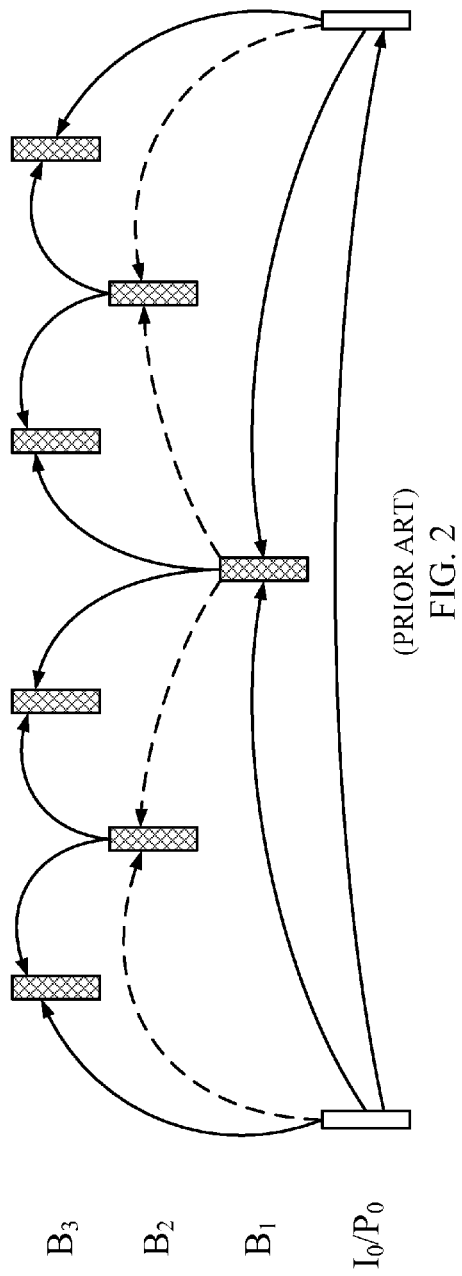
FIG. 2 illustrates an example of layered codec image frame types and temporal organization in presentation order.

The essential frames typically occupy the codec base layer. There is another category of video frame data that contains no data that is persistent in video frame buffers. This data is optional with respect to generating an image sequence and may occupy a codec enhancement layer. Some types of data only impact a very temporary buffer and might be made optional. FIG. 2 illustrates a conventional example of various codec data frame types, presented in the familiar GOP (Group of Pictures) format. The frames labeled $B_3$ may be dropped with no impact on video frame buffer memory, and may therefore be considered optional for transmission. Frames labeled $B_2$ have a short term impact on memory and could also be dropped, if necessary, without the stream suffering long term video buffer contamination.

A given period of time (for example, the one-second evaluation window used in FLO embodiments) within a video stream has a requirement for bit rate. As indicated above, with layered codec operation, the bit rate has at least two components, the essential data frames and the optional data frames. There may be a hierarchy of optional frame types. In some embodiments, the essential data is mapped to the base modulation layer, while the non-essential (optional) data may be sent in one or more enhancement modulation layers. Some embodiments use respective MLCs for respective codec layers, subdividing the required and optional data according to relative importance. In some embodiments, for example, the data subdividing may be: 3 video frames in an MLC corresponding to the codec base layer; 9 video frames in an MLC corresponding to a first codec enhancement layer; and 12 video frames in an MLC corresponding to a second codec enhancement layer. This forms a hierarchical temporal resolution structure according to received signal strength, i.e., 3 frames per second, 12 frames per second, and ultimately 24 frames per second video.

In the FLO physical layer, MLCs have discrete data sizes that respectively correspond to discrete data rates. The minimum assigned MLC size is at least as large as the amount of data that the MLC is to carry. The difference between the size of the assigned MLC and the amount of data that it will carry is referred to herein as the MLC quantization error. The steps between the discrete MLC sizes are typically in the range of 12 to 16 kb for the FLO physical layer example. In some implementations, video data size in bytes per second is almost a random variable relative to the discrete set of MLC data sizes available, so there is the potential for a loss of efficiency approximately equal to one half of the MLC step size, i.e., 6 to 8 kb. The sizes of the optional frames are often smaller than the MLC quantization error. Accordingly, some embodiments insert optional, e.g., enhancement layer, frames into a non-layered MLC that carries the required, e.g., codec base layer, frames.

In the example of FIG. 2, the ranked order is, from highest to lowest, $I_0/P_0$ frames, $B_1$ frames, $B_2$ frames, and finally $B_3$ frames. The $I_0/P_0$ frames are required. In some embodiments, the remaining frames are optional. In some embodiments, the $I_0/P_0$ frames and the $B_1$ frames are required, and the remaining frames are optional. The definition of which frame types are required and which are optional varies among various embodiments, depending on the particular application.

In some embodiments, a decision to combine optional frames in an MLC with required frames may provide the best temporal rendition under the available transmission capacity circumstances. Capacity for optional frames is often available in an MLC that carries required frames from the codec base layer, because optional frames (such as $B_3$ in FIG. 2) are typically relatively small compared to the average MLC quantization error. In fact, for some video applications, in a low motion sequence, the sum total size of all codec enhancement layer frames is approximately equal to the average MLC quantization error. Accordingly, some embodiments may determine that the best solution is to place all codec enhancement layer frames in a non-layered MLC that also carries the codec base layer frames, without sending any MLC (or MLCs) dedicated to the codec enhancement layer(s). An example of this is shown generally at 49 in FIG. 4, which is described in more detail below.

Conversely, for high motion sequences, the size of the $B_3$ frames is on average about 4 code groups. By placing these $B_3$ frames in a separate MLC with, e.g., nominally twice the bps/Hz, it is possible to reduce the total required physical layer resources. An example of this is shown generally at 39 in FIG. 3, which is described in more detail below.

In some embodiments, optional frames may be dropped completely to make the codec data fit a specific MLC size. An example of this is shown generally at 37 in FIG. 3. In some embodiments, the aggregate physical layer resources required may be used as a criterion for deciding whether to drop optional frames.

Video codecs may also layer video in a spatial sense. For example the codec base layer may be QVGA and the combination of that layer with a codec enhancement layer renders VGA. The relative data sizes of the codec base layer and the codec enhancement layer in such an example is likely 2:1 to 3:1. A primary application for such a system can be automotive, as the displays in cars may be larger than those on a mobile handset, so more resolution is desirable. Since the nominal modulation layering mechanism results in a 1:1 bandwidth ratio between the codec base layer and the codec enhancement layer, some embodiments map a first portion of the codec enhancement layer data to the modulation enhancement layer of a layered MLC that also carries the codec base layer data, with the remainder of the codec enhancement layer data mapped to a separate, non-layered MLC of a higher bps/Hz. An example of this approach is shown at 67 in FIG. 6 which is described in more detail below. Another option is mapping all the codec base layer data to a first non-layered MLC, and mapping all the codec enhancement layer data to a second non-layered MLC (see also 69 in FIG. 6).

Some embodiments map a portion of the codec enhancement layer data to a first non-layered MLC that also carries the codec base layer data. The remainder of the codec enhancement layer data is mapped to a second non-layered MLC as above. The partial mapping of the codec enhancement layer data to the first non-layered MLC helps eliminate padding in that MLC, and thereby improves efficiency.

In general, the respective efficiencies of various schemes for partitioning the transmission of codec enhancement data frames among some amount "N" of MLCs may be calculated, and the best solution selected on a (FLO) superframe by superframe basis. For example, various embodiments exhibit savings in physical layer resources between 33 and 37%.

Figure 3:
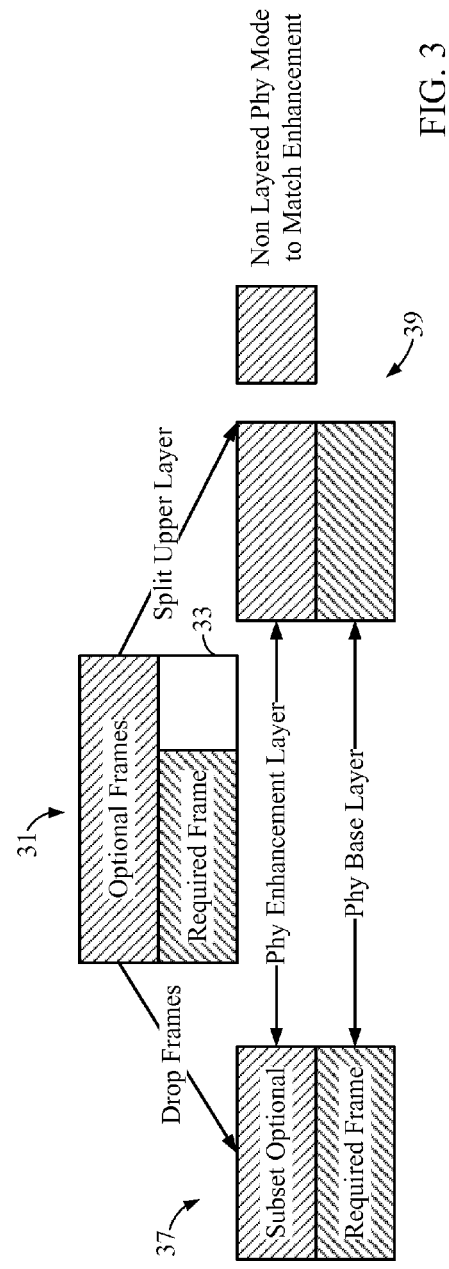
FIGS. 3 and 4 illustrate options for mapping layered codec data onto logical channels according to exemplary embodiments of the present work based on different outcomes of video encoding process with respect to required bit rate by layer.

FIG. 3 diagrammatically illustrates operations that may be performed according to exemplary embodiments of the present work. The required and optional frames produced by the codec for transmission are shown generally at 31. In the example of FIG. 3, the amount of optional frame data exceeds the amount of required frame data. If the required and optional frames are mapped in conventional fashion to the base and enhancement modulation layers, respectively, of a layered MLC, there will be (aside from any MLC quantization error) unused transmission capacity corresponding to the difference 33 between the respective amounts of optional and required frame data.

Figure 1:
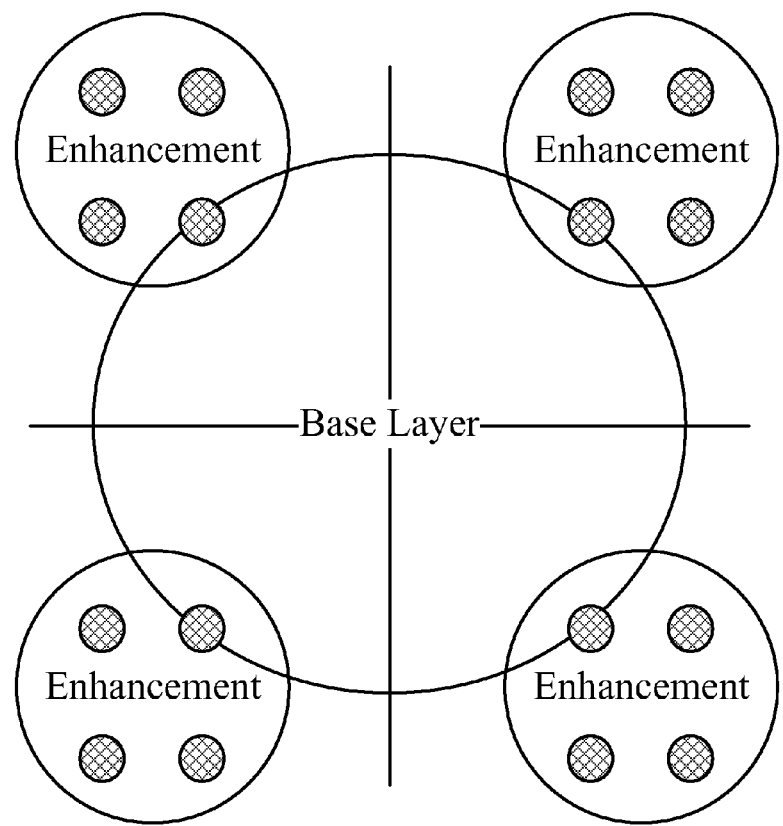
FIG. 1 illustrates a conventional example of a two-layer logical channel carried on a 16 QAM signal constellation.

As shown generally at 37, some embodiments drop enough optional frames to equalize the respective amounts of required and optional frame data, and map the required frames and the remaining optional frames, respectively, to the base and enhancement layers of a layered MLC (see also FIG. 1). As shown generally at 39, some embodiments retain all optional frames, and map the optional frames that are dropped at 37 to a separate non-layered MLC that is transmitted in addition to a layered MLC having the same content as the layered MLC shown at 37. The codec enhancement layer is thus split, and apportioned between the layered and non-layered MLCs shown at 39.

Figure 4:
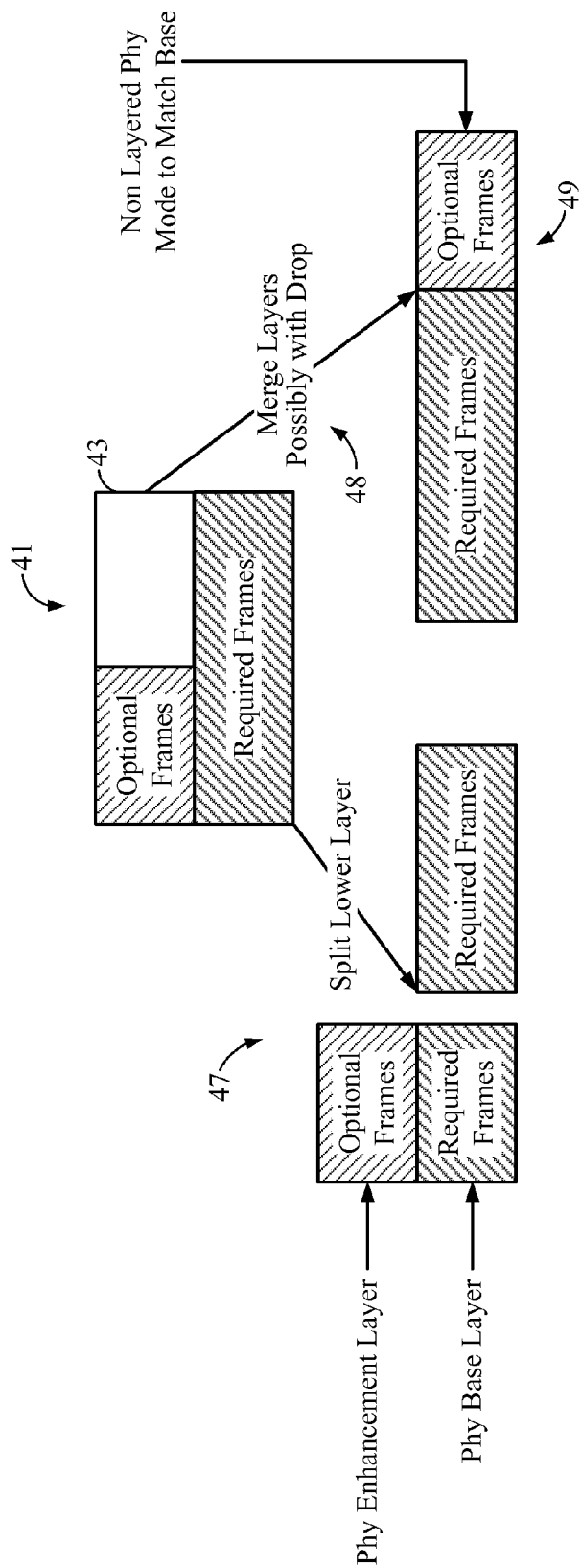

FIG. 4 diagrammatically illustrates further operations according to exemplary embodiments of the present work. As shown at 41, the amount of required codec frame data exceeds the amount of optional frame data. Similarly to the situation in FIG. 3, conventional mapping of the required and optional frames to the base and enhancement modulation layers of a layered MLC will result in unused capacity corresponding to the difference 43 between the respective amounts of required and optional frame data.

As shown at 47, some embodiments map the excess of required frame data to a non-layered MLC, and map the remainder of the required frame data and the equal amount of optional frame data to the base and enhancement modulation layers, respectively, of a layered MLC. The codec base layer (required frames) is thus split, and apportioned between the layered and non-layered MLCs shown generally at 47. Some embodiments map both the required and optional frames to a single non-layered MLC, as shown generally at 49. In some embodiments, a portion of the optional frames may be dropped at 48 in order to meet the data size requirement of the non-layered MLC shown at 49.

Figure 5:
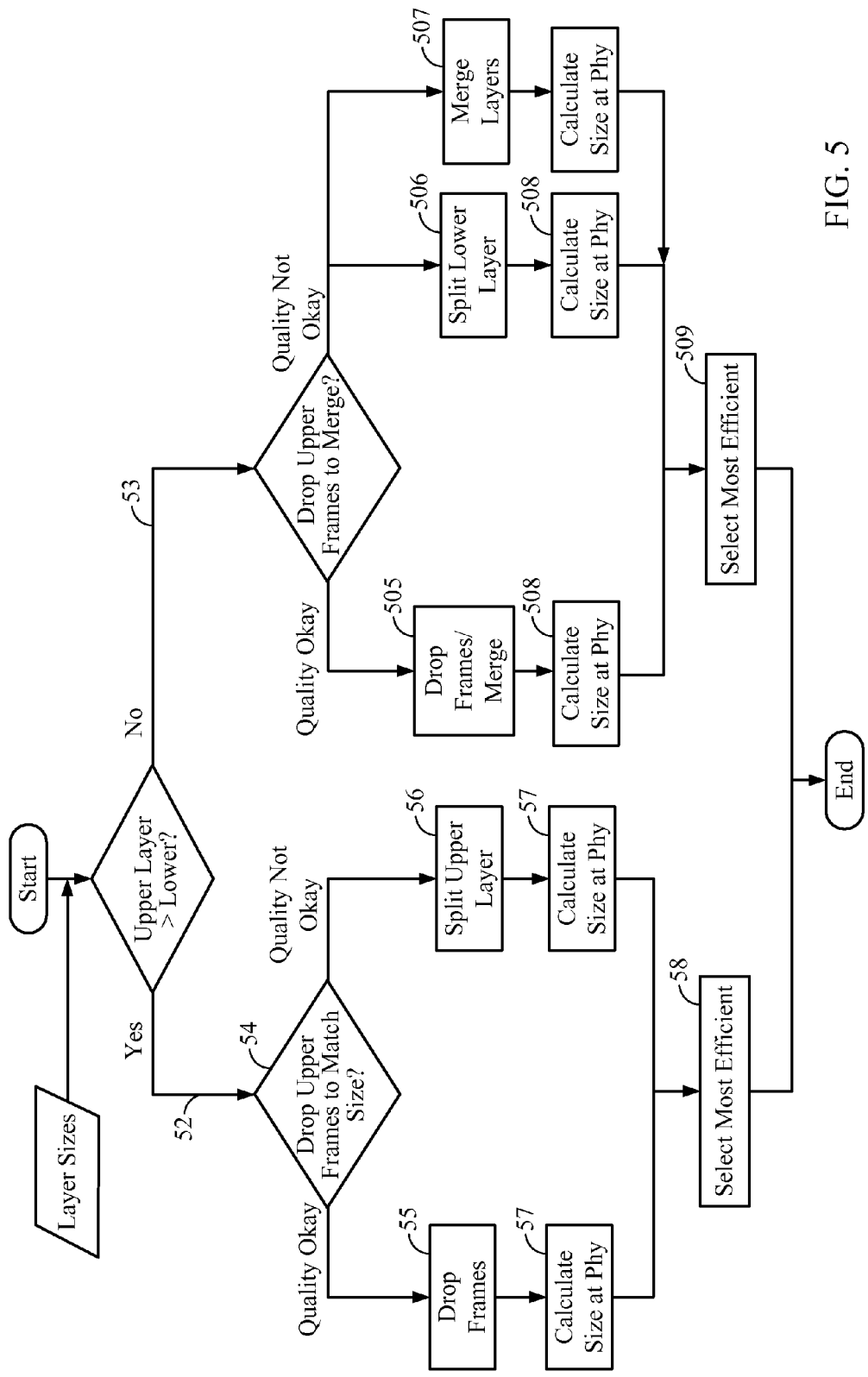
FIG. 5 is a flow chart illustrating a process capable of selecting one of the logical channel mappings of FIGS. 3 and 4 according to exemplary embodiments of the present work.

FIG. 5 illustrates operations according to exemplary embodiments of the present work. In some embodiments, the branches 52 and 53 respectively correspond to the codec data examples 31 and 41 of FIGS. 3 and 4. Referencing branch 52, and as shown at 54, consideration of the option of dropping optional frames at 55 (see also 37 in FIG. 3) is conditioned on whether the resulting service quality would be acceptable. The option of apportioning the codec enhancement layer (optional frames) among different MLCs without dropping any optional frames (see also 39 in FIG. 3) is considered at 56 within branch 52 regardless of whether the aforementioned service quality condition is met. At 57, the efficiencies of the various possible MLC packaging arrangements for each applicable option 55 and/or 56 are calculated, e.g., based on codec data layer sizes and available MLC sizes. The most efficient packaging arrangement is selected at 58 for use in transmission.

Referencing branch 53 of FIG. 5, the option of dropping optional frames and merging the remainder with the required frames at 505 (see also 48 and 49 in FIG. 4) is conditioned on the acceptability of the resulting service quality. The options of apportioning the required frames among different MLCs (see also 47 in FIG. 4) and merging all optional frames with the required frames (see also 49 in FIG. 4) at 506 and 507, respectively, are considered regardless of whether the aforementioned service quality condition is met. At 508, the efficiencies of the various possible MLC packaging arrangements for each applicable option 505 and/or 506 and 507 are calculated. The most efficient packaging arrangement is selected at 509 for use in transmission.

Figure 6:
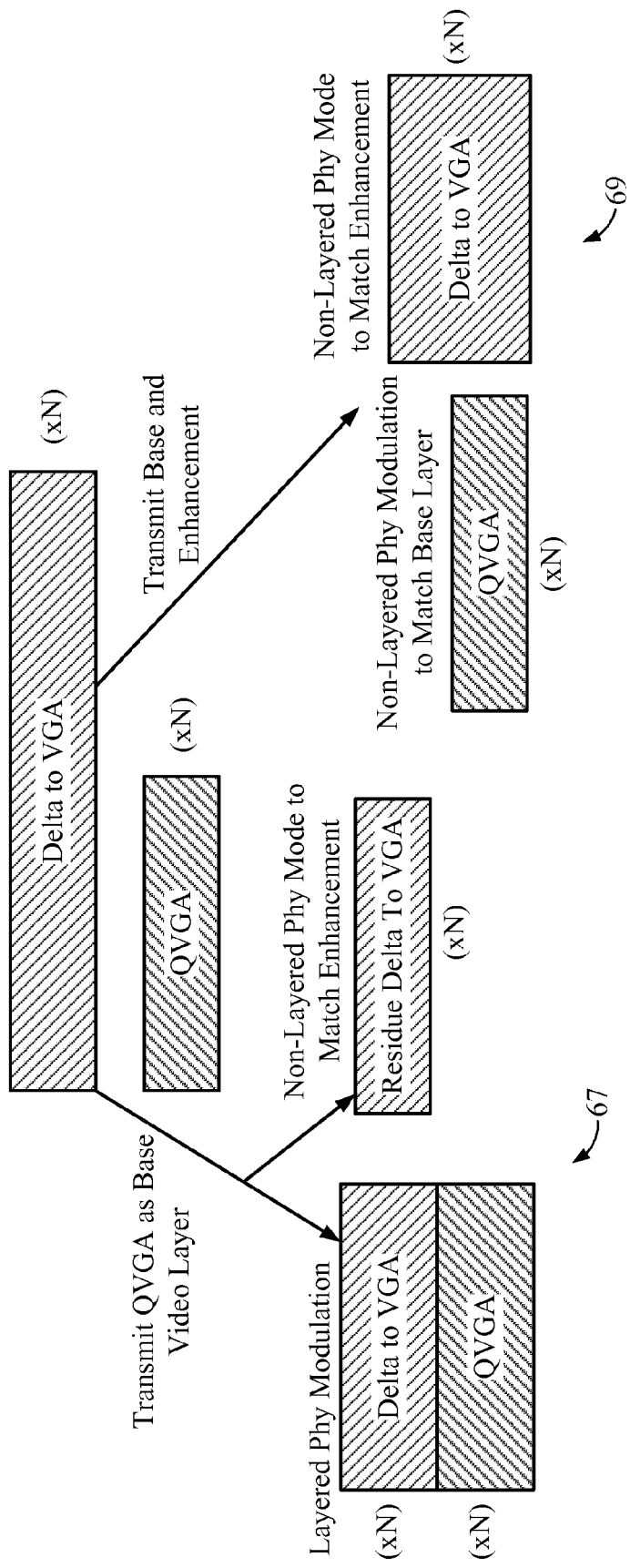
FIG. 6 illustrates options for mapping spatially layered codec data onto logical channels according to exemplary embodiments of the present work.

FIG. 6 diagrammatically illustrates packaging spatially layered video codec data according to exemplary embodiments of the present work. As mentioned above, the codec enhancement layer data (shown as "Delta to VGA") may be, for example, two or three times as large as the corresponding codec base layer, e.g., QVGA, data with which it will be combined to render VGA. As shown at 67, some embodiments use a layered MLC for the QVGA and part of the "Delta to VGA" data, and also use a non-layered MLC for the remainder of the "Delta to VGA" data. Illustrated at 69 are embodiments that map the QVGA and "Delta to VGA" data to respective non-layered MLCs.

Figure 7:
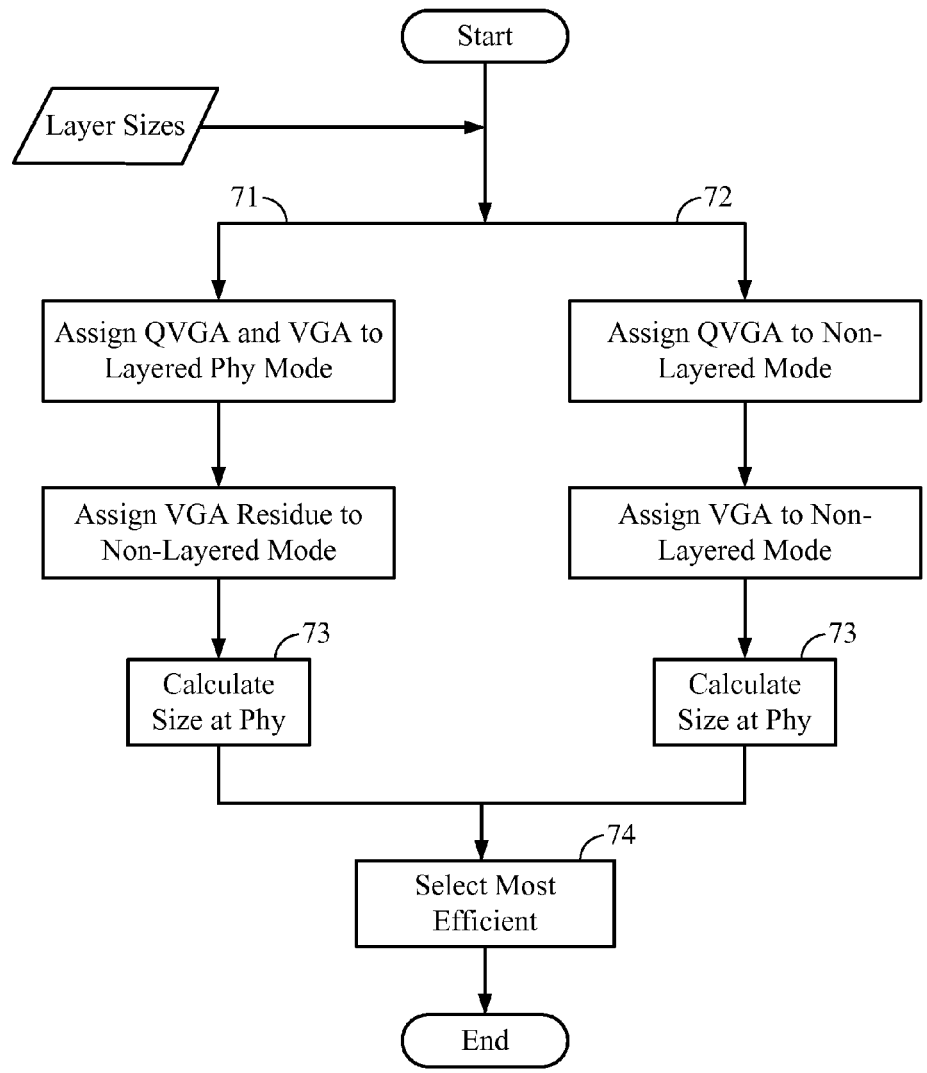
FIG. 7 is a flow chart illustrating a process capable of selecting one of the logical channel mappings of FIG. 6 according to exemplary embodiments of the present work.

FIG. 7 illustrates operations according to exemplary embodiments of the present work. The branches 71 and 72 illustrate options that, in some embodiments, respectively correspond to the situations shown at 67 and 69 in FIG. 6. At 73, the efficiencies of the various possible MLC packaging arrangements for both options 71 and 72 are calculated. The most efficient packaging arrangement is selected at 74.

Some embodiments achieve additional efficiencies, e.g., bandwidth savings, by extending the techniques shown and described with respect to FIGS. 6 and 7 to a plurality of video streams respectively produced by a plurality of video codecs. In some embodiments, operations are generally the same as shown and described with respect to FIGS. 6 and 7, but are applied to codec base layer data, e.g., QVGA, from a plurality of codecs, and to codec enhancement layer data, e.g., "Delta to VGA," from the plurality of codecs. As such, the QVGA data shown in FIG. 6 would be QVGA data from each of the plurality of codecs, and the "Delta to VGA" data shown in FIG. 6 would be "Delta to VGA" data from each of the plurality of codecs. Embodiments that operate on a plurality of video streams from a plurality of codecs are indicated generally in FIG. 6 by the parenthetical "xN" designations, where N represents the plural number of video streams processed, i.e., N video streams from N codecs.

Figure 8:
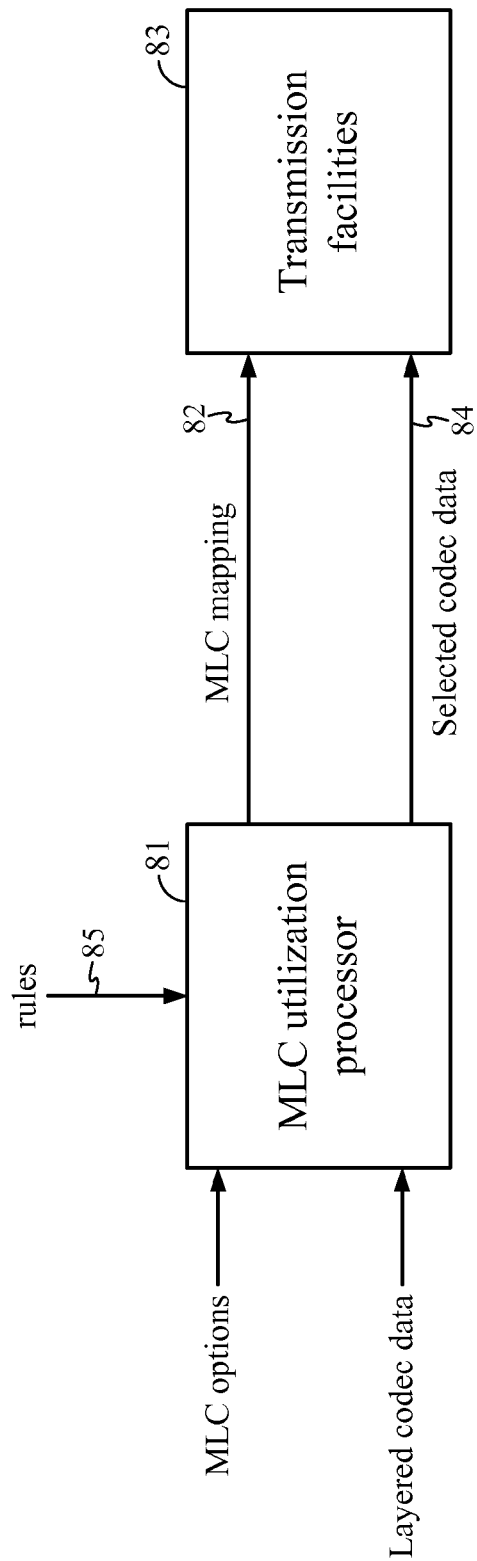
FIG. 8 diagrammatically illustrates an apparatus for packaging layered codec data into logical channels according to exemplary embodiments of the present work.

FIG. 8 diagrammatically illustrates an apparatus for packaging layered codec data in logical channels, e.g., MLCs in FIG. 8, according to exemplary embodiments of the present work. In some embodiments, the apparatus of FIG. 8 is provided in networks 106 and 108 of FIG. 9. MLC utilization processor 81 determines how to map the codec data to MLCs based on the layered codec data, e.g., 31, 41 and 61 in FIGS. 3, 4 and 6, and the available MLCs. In various embodiments, the utilization processor 81 performs operations such as described above relative to FIGS. 3-7 to determine the MLC mapping 82. This mapping 82 is input to system transmission facilities 83 together with the codec data 84 that corresponds to the mapping 82. The transmission facilities 83 use the mapping to package the codec data into MLCs for transmission over an air interface, which is shown, e.g., in FIG. 9.

Various embodiments use various rules (see 85 in FIG. 8) for dropping optional codec frames when selecting MLC packaging arrangements. Examples include: dropping the largest frames first; dropping the smallest frames first; dropping the smallest number of frames to meet a target rate reduction; and limiting the number of dropped frames.

Figure 10:
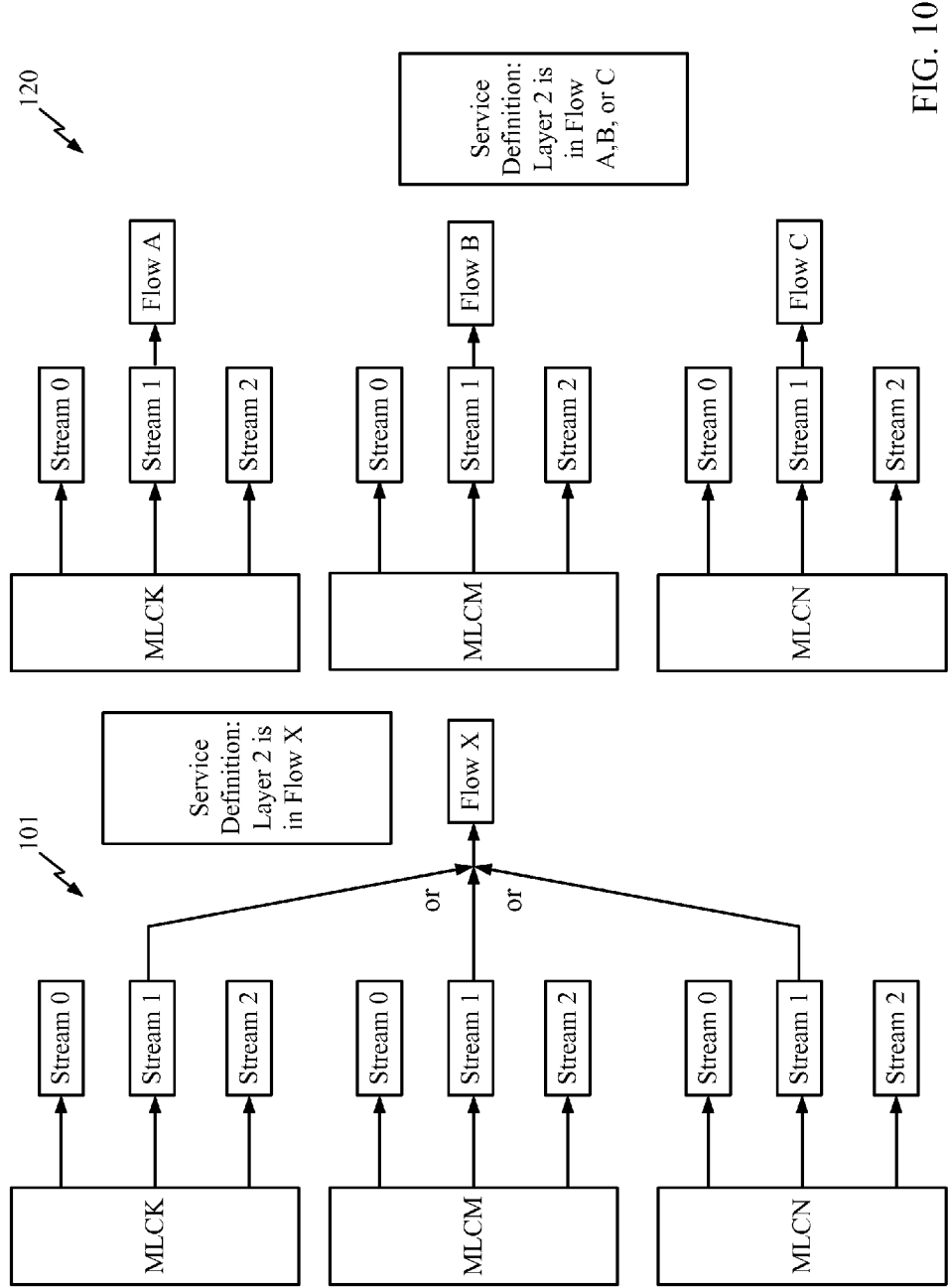
FIG. 10 diagrammatically illustrates service definitions according to exemplary embodiments of the present work.

FIG. 10 diagrammatically illustrates service definitions according to exemplary embodiments of the present work. In FIG. 10, data from a given block of layered codec data may be mapped onto one or more of the MLCs K, M and N. Service definition 101 specifies that a codec data layer 2 is provided in Flow X of a MediaFLO service, where each of MLCs K, M and N has stream 1 thereof mapped to Flow X. Service definition 102 specifies that codec data layer 2 is provided in a group of flows, e.g., Flow A, Flow B and Flow C, of a Media-FLO service, where MLC K has stream 1 thereof mapped to Flow A, MLC M has stream 1 thereof mapped to Flow B, and MLC N has stream 1 thereof mapped to Flow C.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other non-transitory form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:
1. An apparatus for allocating data onto logical channels for increasing utilization of wireless transmission resources, the apparatus comprising:
an input configured to receive a block of data from a coder, said block of data containing a plurality of hierarchical layers of data; and a processor coupled to said input and configured to produce a plurality of mappings of data onto a plurality of logical channels from received block of data, the plurality of mappings having different arrangements for each mapping, the mapping being based on layered and non-layered arrangements of the plurality of logical channels, to calculate an efficiency for each of the plurality of mappings, and to select one of the plurality of mappings for wireless transmission of the mapped data based on the calculated efficiencies.

2. The apparatus of claim 1, wherein one of said logical channels supports a plurality of hierarchical data channels carried on a transmit modulation scheme, and another of said logical channels supports only a single data channel carried on the transmit modulation scheme.

3. The apparatus of claim 2, wherein said hierarchical data channels of said one logical channel carry data from respective ones of the hierarchical layers, and wherein said another logical channel carries data from only one of the hierarchical layers.

4. The apparatus of claim 3, wherein one of the hierarchical data channels carries essential data from the block, and another of the hierarchical data channels carries optional data from the block.

5. The apparatus of claim 4, wherein said another hierarchical data channel carries a subset of a total amount of optional data contained in the block, and said another logical channel carries another subset of the total amount of optional data contained in the block.

6. The apparatus of claim 4, wherein said one hierarchical data channel carries a subset of a total amount of essential data contained in the block, and said another logical channel carries another subset of the total amount of essential data contained in the block.

7. The apparatus of claim 3, wherein said only one of the hierarchical layers consists of essential data of the block.

8. The apparatus of claim 3, wherein said only one of the hierarchical layers consists of optional data of the block.

9. The apparatus of claim 1, wherein at least one of said mappings comprises data from at least two of the hierarchical layers onto a further logical channel, and wherein said processor is configured to choose between said plurality of mappings for wireless transmission of the mapped data.

10. The apparatus of claim 9, wherein one of said plurality of logical channels supports a plurality of hierarchical data channels carried on a transmit modulation scheme, wherein another of said plurality of logical channels supports only a single data channel carried on the transmit modulation scheme, and wherein said further logical channel supports only a single data channel carried on the transmit modulation scheme.

11. The apparatus of claim 10, wherein said further mapping excludes a portion of one of the hierarchical layers.

12. The apparatus of claim 9, wherein one of said plurality of logical channels supports a plurality of hierarchical data channels carried on a transmit modulation scheme, wherein another of said plurality of logical channels supports only a single data channel carried on the transmit modulation scheme, wherein said further logical channel supports a plurality of hierarchical data channels carried on the transmit modulation scheme, and wherein said further mapping excludes a portion of one of the hierarchical layers.

13. The apparatus of claim 1, wherein each of said logical channels supports only a single data channel carried on a transmit modulation scheme.

14. The apparatus of claim 1, wherein said processor is configured to choose between said plurality of mappings for wireless transmission of the mapped data.

15. The apparatus of claim 14, wherein one of said first-mentioned plurality of logical channels supports a plurality of hierarchical data channels carried on a transmit modulation scheme, wherein another of said first-mentioned plurality of logical channels supports only a single data channel carried on the transmit modulation scheme, and wherein each of said further plurality of logical channels supports only a single data channel carried on the transmit modulation scheme.

16. The apparatus of claim 1, wherein the data block contains one of audio data and age data.

17. The apparatus of claim 1, wherein said logical channels are Multicast Logical. Channels of a Media Forward Link Only system.

18. An apparatus for allocating data onto logical channels for increasing utilization of wireless transmission resources, the apparatus comprising:
  means for receiving a block of data from a coder, said block of data containing a plurality of hierarchical layers of data;
  means for producing a plurality of mappings of data onto a plurality of logical channels from the received block of data, the plurality of mappings having different arrangements for each mapping, the mapping being based on layered and non-layered arrangements of the plurality of logical channels;
  means for calculating an efficiency for each of the plurality of mappings; and
  means for selecting one of the plurality of mappings for wireless transmission of the mapped data based on the calculated efficiencies.

19. The apparatus of claim 18, wherein one of said logical channels supports a plurality of hierarchical data channels carried on a transmit modulation scheme, and another of said logical channels supports only a single data channel carried on the transmit modulation scheme.

20. The apparatus of claim 19, wherein said hierarchical data channels of said one logical channel carry data from respective ones of the hierarchical layers, and wherein said another logical channel carries data front only one of the hierarchical layers.

21. The apparatus of claim 20, wherein one of the hierarchical data channels carries essential data from the block, and another of the hierarchical data channels carries optional data from the block.

22. The apparatus of claim 21, wherein said another hierarchical data channel carries a subset of a total amount of optional data contained in the block, and said another logical channel carries another subset of the total amount of optional data contained in the block.

23. The apparatus of claim 21, wherein said one hierarchical data channel carries a subset of a total amount of essential data contained in the block, and said another logical channel carries another subset of the total amount of essential data contained in the block.

24. The apparatus of claim 20, wherein said only one of the hierarchical layers consists of essential data of the block.

25. The apparatus of claim 20, wherein said only one of the hierarchical layers consists of optional data of the block.

26. The apparatus of claim 18, wherein at least one of the plurality of mappings comprises data from at least two of the hierarchical layers onto a further logical channel, and wherein the apparatus further includes means for choosing between said plurality of mappings for wireless transmission of the mapped data.

27. The apparatus of claim 26, wherein one of said plurality of logical channels supports a plurality of hierarchical data channels carried on a transmit modulation scheme, wherein another of said plurality of logical channels supports only a single data channel carried on the transmit modulation scheme, and wherein said further logical channel supports only a single data channel carried on the transmit modulation scheme.

28. The apparatus of claim 27 wherein said further mapping excludes portion of one of the hierarchical layers.

29. The apparatus of claim 26, wherein one of said plurality of logical channels supports a plurality of hierarchical data channels carried on a transmit modulation scheme, wherein another of said plurality of logical channels supports only a single data channel carried on the transmit modulation scheme, wherein said further logical channel supports a plurality of hierarchical data channels carried on the transmit modulation scheme, and wherein said further mapping excludes a portion of one of the hierarchical layers.

30. The apparatus of claim 18, wherein each of said logical channels supports only a single data channel carried on a transmit modulation scheme.

31. The apparatus of claim 18, including means for choosing between said plurality of mappings for wireless transmission of the mapped data.

32. The apparatus of claim 31, wherein one of said first-mentioned plurality of logical channels supports a plurality of hierarchical data channels carried on a transmit modulation scheme, wherein another of said first-mentioned plurality of logical channels supports only a single data channel carried on the transmit modulation scheme, and wherein each of said further plurality of logical channels supports only a single data channel carried on the transmit modulation scheme.

33. The apparatus of claim 18, wherein the data block contains one of audio data and image data.

34. The apparatus of claim 18, wherein said logical channels are Multicast Logical Channels of a Media Forward Link Only system.

35. A method for allocating data onto logical channels for increasing utilization of wireless transmission resources, the method comprising:
   receiving a block of data from a coder, said block of data containing a plurality of hierarchical layers of data;
   producing a plurality of mappings of data onto a plurality of logical channels from the received block of data, the plurality of mappings having different arrangements for each mapping the mapping being based on layered and non-layered arrangements of the plurality of logical channels;
   calculating an efficiency for each of the plurality of mapping; and
   selecting one of the plurality of mappings for wireless transmission of the mapped data base the calculated efficiencies.

36. The method of claim 35, wherein one of said logical channels supports a plurality of hierarchical data channels carried on a transmit modulation scheme, and another of said logical channels supports only a single data channel carried on the transmit modulation scheme.

37. The method of claim 36, wherein said hierarchical data channels of said one logical channel carry data from respective ones of the hierarchical layers, and wherein said another logical channel carries data from only one of the hierarchical layers.

38. The method of claim 37, wherein one of the hierarchical data channels carries essential data from the block, and another of the hierarchical data channels carries optional data from the block.

39. The method of claim 38, wherein said another hierarchical data channel carries a subset of a total amount of optional data contained in the block, and said another logical channel carries another subset of the total amount of optional data contained in the block.

40. The method of claim 38, wherein said one hierarchical data channel carries a subset of a total amount of essential data contained in the block, and said another logical channel carries another subset of the total amount of essential data contained in the block.

41. The method of claim 37, wherein said only one of it e hierarchical layers consists of essential data of the block.

42. The method of claim 37, wherein said only one of the hierarchical layers consists of optional data of the block.

43. The method of claim 35, wherein at least one of said plurality of mappings includes data from at least two of the hierarchical layers onto a further logical channel, the method further comprising choosing between said plurality of mappings for wireless transmission of the mapped data.

44. The method of claim 43, wherein one of said plurality of logical channels supports a plurality of hierarchical data channels carried on a transmit modulation scheme, wherein another of said plurality of logical channels supports only a single data channel carried on the transmit modulation scheme, and wherein said further logical channel supports only a single data channel carried on the transmit modulation scheme.

45. The method of claim 44, wherein said further mapping excludes a portion of one of the hierarchical layers.

46. The method of claim 43, wherein one of said plurality of logical channels supports a plurality of hierarchical data channels carried on a transmit modulation scheme, wherein another of said plurality of logical channels supports only a single data channel carried on the transmit modulation scheme, wherein said further logical channel supports a plurality of hierarchical data channels carried on the transmit modulation scheme, and wherein said further mapping excludes a portion of one of the hierarchical layers.

47. The method of claim 35, wherein each of said logical channels supports only a single data channel carried on a transmit modulation scheme.

48. The method of claim 35, choosing between said plurality of mappings for wireless transmission of the mapped data.

49. The method of claim 48, wherein one of said first-mentioned plurality of channels supports a plurality of hierarchical data channels carried on a transmit modulation scheme, wherein another of said first-mentioned plurality of logical channels supports only a single data channel carried on the transmit modulation scheme, and wherein each of said further plurality of logical channels supports only a single data channel carried on the transmit modulation scheme.

50. The method of claim 35, wherein the data block contains one of audio data and image data.

51. The method of claim 35, wherein said logical channels are Multicast Logical Channels of a Media Forward Link Only system.

52. A non-transitory computer readable storage medium encoded with a computer program the program comprising instructions that when executed by a data processing apparatus cause the data processing apparatus to perform operations comprising:

receiving a block of data from a coder, said block of data containing a plurality of hierarchical layers of data;

producing a plurality of mappings of data onto a plurality of logical channels from the received block of data, the plurality of mappings having different arrangements for each mapping the mapping being based on layered and non-layered arrangements of the plurality of logical channels;

calculating an efficiency for each of the plurality of mappings; and selecting one of the plurality of mappings for wireless transmission of the mapped data based on the calculated efficiencies.

53. The non-transitory computer readable storage medium of claim 52, wherein one of said logical channels supports a plurality of hierarchical data channels carried on a transmit modulation scheme, and another of said logical channels supports only a single data channel carried on the transmit modulation scheme.

54. The non-transitory computer readable storage medium of claim 53, wherein said hierarchical data channels of said one logical channel carry data from respective ones of the hierarchical layers, and wherein said another logical channel carries data from only one of the hierarchical layers.

55. The non-transitory computer readable storage medium of claim 54, wherein one of the hierarchical data channels carries essential data from the block, and another of the hierarchical data channels carries optional data from the block.

56. The non-transitory computer readable storage medium of claim 55, wherein said another hierarchical data channel carries a subset of a total amount of optional data contained in the block, and said another logical channel carries another subset of the total amount of optional data contained in the block.

57. The non-transitory computer readable storage medium of claim 55, wherein said one hierarchical data channel carries a subset of a total amount of essential data contained in the block, and said another logical channel carries another subset of the total amount of essential data contained in the block.

58. The non-transitory computer readable storage medium of claim 54, wherein said only one of the hierarchical layers consists of essential data of the block.

59. The non-transitory computer readable storage medium of claim 54, wherein said only one of the hierarchical layers consists of optional data of the block.

60. The non-transitory computer readable storage medium of claim 52, wherein at least one of said plurality of mappings comprises data from at least two of the hierarchical layers onto a further logical channel, wherein said operations include choosing between said plurality of mappings for wireless transmission of the mapped data.

61. The non-transitory computer readable storage medium of claim 60, wherein one of said plurality of logical channels supports a plurality of hierarchical data channels carried on a transmit modulation scheme, wherein another of said plurality of logical channels supports only a single data channel carried on the transmit modulation scheme, and wherein said further logical channel supports only a single data channel carried on the transmit modulation scheme.

62. The non-transitory computer readable storage medium of claim 61, wherein said further mapping excludes a portion of one of the hierarchical layers.

63. The non-transitory computer readable storage medium of claim 60, wherein one of said plurality of logical channels supports a plurality of hierarchical data channels carried on a transmit modulation scheme, wherein another of said plurality of logical channels supports only a single data channel carried on the transmit modulation scheme, wherein said further logical channel supports a plurality of hierarchical data channels carried on the transmit modulation scheme, and wherein said further mapping excludes a portion of one of the hierarchical layers.

64. The non-transitory computer readable storage medium of claim 52, wherein each of said logical channels supports only a single data channel carried on a transmit modulation scheme.

65. The non-transitory computer readable storage medium of claim 52, wherein said operations include choosing between said plurality of mappings for wireless transmission of the mapped data.

66. The non-transitory computer readable storage medium of claim 65, wherein one of said first-mentioned plurality of logical channels supports a plurality of hierarchical data channels carried on a transmit modulation scheme, wherein another of said first-mentioned plurality of logical channels supports only a single data channel carried on the transmit modulation scheme, and wherein each of said further plurality of logical channels supports only a single data channel carried on the transmit modulation scheme.

67. The non-transitory computer readable storage medium of claim 52, wherein the data block contains one of audio data and image data.

68. The non-transitory computer readable storage medium of claim 52, wherein said logical channels are Multicast Logical Channels of a Media Forward Link Only system.

69. An apparatus for allocating data onto logical channels for increasing utilization of wireless transmission resources, the apparatus comprising:

an input for receiving a block of data from a coder, said block of data containing a plurality of hierarchical layers of data; and a processor coupled to said input and configured to produce a plurality of mappings of data onto a logical channel from the received block of data, the plurality of mappings having different arrangements for each mapping, the mapping being based on layered and non-layered arrangements of the plurality of logical channels, to calculate an efficiency tor each of the plurality of mappings, and to select one of the plurality of mappings for wireless transmission of the mapped data based or the calculated efficiencies;

wherein said logical channel supports only a single data channel carried by a transmit modulation scheme.

70. The apparatus of claim 69, wherein said mapping excludes a portion of one of the hierarchical layers.

71. An apparatus for allocating data onto logical channels for increasing utilization of wireless transmission resources, the apparatus comprising:

means for receiving a block of data from a coder, said block of data containing a plurality of hierarchical layers of data;

means for producing a plurality of mappings of data onto a logical channel from the received block of data, the plurality of mappings having different arrangements for each mapping the mapping being based on layered and non-layered arrangements of the plurality of logical channels;

means for calculating an efficiency for each of the plurality of mappings; and means for selecting one of the plurality of mappings for wireless transmission of the mapped data based on the calculated efficiencies wherein said logical channel supports only a single data channel carried by a transmit modulation scheme.

72. A method for allocating data. onto logical channels for increasing utilization of wireless transmission resources, the method comprising:
- receiving a block of data from a coder, said block of data containing a plurality of hierarchical layers of data;
- producing a plurality of mappings of data onto a logical channel from the received block of data the plurality of mappings having different arrangements for each mapping, the mapping being based on layered and non-layered arrangements of the plurality of logical channels;
- calculating an efficiency for each of the plurality of mappings; and
- selecting one of the plurality of mappings for wireless transmission of the mapped data based on the calculated efficiencies;
- wherein said logical channel supports only a single data channel carried by a transmit modulation scheme.

73. The method of claim 72, wherein said mapping excludes a portion of one of the hierarchical layers.

74. A computer program product for supporting allocation of data onto logical channels for increasing utilization of wireless transmission resources, comprising:
- a non-transitory computer readable medium comprising:
  - code for causing at least one data processor to receive a block of data from a coder, said block of data containing a plurality of hierarchical layers of data;
  - code for causing the at least one data processor to produce plurality of mappings of data onto a logical channel from the received block of data, the plurality of mappings having different arrangements for each mapping, the mapping being based on layered and non-layered arrangements of the plurality of logical channels, to calculate an efficiency for each of the plurality of mappings, and to select one of the plurality of mappings for wireless transmission of the mapped data based on the calculated efficiencies:
  - wherein said logical channel supports only a single data channel carried by a transmit modulation scheme.

75. An apparatus for allocating data onto logical channels for increasing utilization of wireless transmission resources, the apparatus comprising:
- an input for receiving a block of data from a coder, said block of data containing a plurality of hierarchical layers of data; and
- a processor coupled to said input and configured. to produce a plurality of mappings of data onto a single logical channel from the received block of data, the plurality of mappings having different arrangements for each mapping, the mapping being based on layered and non-layered arrangements of the plurality of logical channels, to calculate an efficiency for each of the plurality of mappings, and select one of the plurality of mappings for wireless transmission of the mapped data based on the calculated efficiencies;
- wherein said mapping excludes a portion of one of the hierarchical layers.

76. An apparatus for allocating data onto logical channels for increasing utilization of wireless transmission resources, the apparatus comprising:
- means for receiving a block of data from a coder, said block of data containing a plurality of hierarchical layers of data;
- means for producing a plurality of mappings of data onto a single logical channel from the received block of data, the plurality of mappings having different arrangements for each mapping, the mapping being based on layered and non-layered arrangements of the plurality of logical channels;
- means for calculating an efficiency for each of the plurality of mappings; and
- means for selecting one of the plurality of mappings for wireless transmission of the mapped data based on the calculated efficiencies;
- wherein said mapping excludes a portion of one of the hierarchical layers.

77. A method for allocating data onto logical channels for increasing utilization of wireless transmission resources, the method comprising:
- receiving a block of data from a coder, said block of data containing a plurality of hierarchical layers of data;
- producing a plurality of mappings of data onto a single logical channel from the received block of data, the plurality of mappings having different arrangements for each mapping in order to select one of the plurality of mappings for wireless transmission of the mapped data, the mapping being based on layered and non-layered arrangements of the plurality of logical channels;
- calculating an efficiency for each of the plurality of mappings; and
- selecting one of the plurality of mappings for wireless transmission of the mapped data based on the calculated efficiencies;
- wherein said mapping excludes a portion of one of the hierarchical layers.

78. A computer program product for supporting allocation of data onto logical channels for increasing utilization of wireless transmission resources, comprising:
- a non-transitory computer readable medium comprising:
- code for causing at least one data processor to receive a block of data from a coder, said block of data containing a plurality of hierarchical layers of data; and
- code for causing the at least one data processor to produce a plurality of mappings of data onto a single logical channel from the received block of data, the plurality of mappings having different arrangements for each mapping, the mapping being based on layered and non-layered arrangements of the plurality of logical channels, to calculate an efficiency for each of the plurality of mappings, and to select one of the plurality of mappings for wireless transmission of the mapped data based on the calculated efficiencies;
- wherein said mapping excludes a portion of one of the hierarchical layers.

* * * * *